(12) United States Patent
Miura et al.

(10) Patent No.: US 9,079,385 B2
(45) Date of Patent: Jul. 14, 2015

(54) LAMINATED SHEET AND COMPOSITE FORMED ARTICLE USING THE SAME

(75) Inventors: Hodaka Miura, Kobe (JP); Akio Sugimoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 408 days.

(21) Appl. No.: 13/473,508

(22) Filed: May 16, 2012

(65) Prior Publication Data

US 2012/0315463 A1  Dec. 13, 2012

(30) Foreign Application Priority Data

Jun. 10, 2011 (JP) ................................ 2011-130071

(51) Int. Cl.
| | | |
|---|---|---|
| *B32B 3/26* | (2006.01) | |
| *B32B 37/12* | (2006.01) | |
| *B32B 15/04* | (2006.01) | |
| *B32B 5/18* | (2006.01) | |
| *B32B 7/12* | (2006.01) | |
| *B32B 15/08* | (2006.01) | |
| *B32B 15/18* | (2006.01) | |
| *B32B 15/20* | (2006.01) | |
| *B32B 37/06* | (2006.01) | |

(52) U.S. Cl.
CPC . *B32B 37/12* (2013.01); *B32B 5/18* (2013.01); *B32B 7/12* (2013.01); *B32B 15/046* (2013.01); *B32B 15/08* (2013.01); *B32B 15/18* (2013.01); *B32B 15/20* (2013.01); *B32B 37/06* (2013.01); *B32B 2250/40* (2013.01); *B32B 2266/025* (2013.01); *B32B 2305/022* (2013.01); *B32B 2307/308* (2013.01); *B32B 2309/105* (2013.01); *B32B 2311/00* (2013.01); *B32B 2605/08* (2013.01)

(58) Field of Classification Search
USPC ........................................... 428/319.1, 317.1
See application file for complete search history.

(56) References Cited

U.S. PATENT DOCUMENTS

| | | | |
|---|---|---|---|
| 3,180,778 A * | 4/1965 | Rinderspacher et al. ..... | 156/311 |
| 6,916,886 B2 * | 7/2005 | Morioka et al. .............. | 525/323 |
| 2004/0005449 A1 | 1/2004 | Sugimoto et al. | |
| 2007/0289689 A1 | 12/2007 | Sugimoto et al. | |
| 2011/0159247 A1 | 6/2011 | Sugimoto et al. | |
| 2011/0159261 A1 | 6/2011 | Sugimoto et al. | |

FOREIGN PATENT DOCUMENTS

| | | |
|---|---|---|
| JP | 2004-042649 A | 2/2004 |
| JP | 2009-262434 | 11/2009 |
| JP | 2010-65564 A | 3/2010 |
| JP | 4559513 B2 | 10/2010 |
| WO | WO 2010/029955 | 3/2010 |
| WO | WO 2010029946 A1 * | 3/2010 |

* cited by examiner

*Primary Examiner* — Hai Vo
(74) *Attorney, Agent, or Firm* — Studebaker & Brackett PC

(57) ABSTRACT

Disclosed are: a composite formed article which is usable even in a high-temperature environment and less suffers delamination between a foamed resin sheet and a metal sheet; and a formed article precursor (laminated sheet) which enables the manufacture of the composite formed article. The laminated sheet includes a foamable resin sheet containing a resin and a foaming agent; and, provided on both sides of the resin sheet, a pair of metal sheets each through the medium of an adhesive. The resin has a melting point of 145° C. or higher, and the adhesive has a melting point substantially equal to or higher than the melting point of the resin.

6 Claims, No Drawings

LAMINATED SHEET AND COMPOSITE FORMED ARTICLE USING THE SAME

FIELD OF THE INVENTION

The present invention relates to a laminated sheet, and a composite formed article obtained from the laminated sheet.

BACKGROUND OF THE INVENTION

The present inventors disclosed a laminated sheet (laminated plate) which has a thickness of 3.4 mm or below and which includes a polypropylene resin sheet containing a foaming agent and a thickness of from 0.5 to 1.4 mm; and an aluminum alloy sheet being laminated on each of the both sides of the polypropylene resin sheet and having a thickness of from 0.05 to 1.0 mm in Japanese Patent No. 4559513. The laminated sheet is subjected to cold forming and then heating to decompose the foaming agent to give a composite formed article which includes a foamed polypropylene resin (expanded) sheet; and an aluminum sheet laminated on both sides of the foamed resin sheet. The resulting composite formed article is used in a variety of applications.

The laminated sheet employs the polypropylene resin sheet having poor cold formability if used alone; in combination with an aluminum alloy sheet having a small thickness and thereby having further poor formability, but contrarily has significantly improved cold formability and is easy to form into a complicated shape. In addition, the laminated sheet also excels in form stability after forming. For these reasons the laminated sheet is advantageously usable as materials for providing formed articles (composite formed articles) having a large area and having a complicated shape, such as automotive panels and parts.

Recent automotive panels and parts should be used in environments at higher temperatures, and along with this requirement, composite formed articles to be used in these applications should have higher heat resistance.

A possible solution to provide a composite formed article having improved heat resistance is a method for producing a multilayer article using a polypropylene resin sheet having a high melting point.

However, a composite formed article obtained by using such a polypropylene resin sheet having a high melting point often suffers from delamination between the foamed polypropylene resin sheet after expansion and the aluminum alloy sheet.

SUMMARY OF THE INVENTION

Under these circumstances, an object of the present invention is to provide a composite formed article which includes a foamed resin sheet and a metal sheet, which can be used even in a high-temperature environment, and which less suffers from delamination between the foamed resin sheet and the metal sheet. Another object of the present invention is to provide a formed article precursor (laminated sheet) which enables the manufacture of the composite formed article.

Accordingly, the present invention provides, in an aspect, a laminated sheet which includes an foamable resin sheet including a resin and a foaming agent; and a pair of metal sheets present on both sides of the foamable resin sheet through the medium of an adhesive. The resin has a melting point of 145° C. or higher, and the adhesive has a melting point substantially equal to or higher than the melting point of the resin.

As used herein the term "melting point" typically of a resin for use in the formation of the foamable resin sheet or of an adhesive refers to a melting point determined by measuring the resin or adhesive with a differential scanning calorimeter (DSC).

In a preferred embodiment of the laminated sheet according to the present invention, the resin is a polyolefinic resin, and the adhesive is a modified polyolefinic resin. In another preferred embodiment, the laminated sheet has a peel strength between the foamable resin sheet and the metal sheet of 1.0 N/mm or more in a T-peel test at a temperature of 150° C. and a peel rate of 100 mm/min.

In yet another preferred embodiment, the laminated sheet according to the present invention is used after being subjected to cold forming and then heating to allow the foaming agent to expand.

As used herein the term "cold forming" refers to forming performed at a temperature of 120° C. or lower.

The present invention also includes a composite formed article obtained by subjecting the laminated sheet to cold forming and then to heating so as to decompose the foaming agent.

Thus, the present invention provides the laminated sheet including a foamed resin sheet and a metal sheet, which can be used even in a high-temperature environment and less suffers from delamination between the foamed resin sheet and the metal sheet.

DETAILED DESCRIPTION OF THE PREFERRED EMBODIMENTS

A laminated sheet according to an embodiment of the present invention includes an foamable resin sheet including a resin and a foaming agent; and a pair of metal sheets present on both sides of the foamable resin sheet through the medium of an adhesive, in which the resin has a melting point of 145° C. or higher, and the adhesive has a melting point substantially equal to or higher than the melting point of the resin.

According to the present invention, delamination between the foamable resin sheet after expansion (i.e., foamed resin sheet) and a metal sheet is suppressed even though the composite formed article is manufactured from a laminated sheet using a high-melting-point resin through a cold forming process and heating/expansion process. Though remaining unknown, the mechanism of this is probably as follows.

Specifically, such a laminated sheet including an foamable resin sheet containing a resin and a foaming agent; and a pair of metal sheets present on both sides of the foamable resin sheet through the medium of an adhesive may be subjected to cold forming so as to increase form accuracy of the resulting composite formed article. In this case, the foamable resin sheet after cold forming has residual stress. If the foamable resin sheet and the metal sheet are not bonded sufficiently to each other, the foamable resin sheet and the metal sheet delaminate from each other in a portion with a large residual stress until the resin sheet softens upon heating, which heating is performed so as to soften the resin sheet and to decompose the foaming agent simultaneously. If the foaming agent is decomposed in this state (in delamination state), gas generated from the foaming agent accumulates the delaminated portion, and this gives a composite formed article in which the foamed resin sheet and the metal sheet are partially largely delaminated from each other.

Customarily, an adhesive having a melting point of at highest 140° C. has been used as the adhesive for the formation of laminated sheets. When an adhesive of this kind is used for the lamination of a metal sheet onto a resin sheet having a high melting point (e.g., a melting point of 145° C. or higher), the melting point of the resin is higher than the melting point of the adhesive. When the resulting laminated sheet is subjected to heating after cold forming, the heating causes the adhesive to soften before the resin softens, thus causing the delamination phenomenon as mentioned above.

In contrast, the laminated sheet according to the present invention is configured by using, in stead of such customary adhesive, an adhesive having a melting point equal to or higher than the melting point of a resin used for the formation of the foamable resin sheet. The laminated sheet having this configuration, even when heated after cold forming, can hold the resin bonding sufficiently to the metal sheet, because the adhesive does not soften before the resin softens. Thus, the laminated sheet gives a composite formed article which less suffers from delamination between the foamed resin sheet and the metal sheet.

The laminated sheet according to the present invention will be illustrated in detail below.

Resin

The resin for the formation of the foamable resin sheet herein has a melting point of 145° C. or higher. The resulting composite formed article using such a high-melting-point resin excels in heat resistance and is thereby usable in a high-temperature environment. The resin has a melting point of preferably 150° C. or higher, and more preferably 155° C. or higher. Though not critical, the upper limit of the melting point of the resin for use herein is preferably 400° C., because a resin having an excessively high melting point is resistant to softening and may not sufficiently help the foamable resin sheet to have a satisfactorily high expansion ratio. When the resin component is a mixture of two or more different resins, the resin mixture should be prepared so as to have a melting point of 145° C. or higher as a mixture.

Examples of the resin include, but are not limited to, polyolefinic resins such as polyethylene resins and polypropylene resins; polycarbonate resins; nylon resins (polyamide resins); polyester resins; polyacetal resins; and poly(phenylene ether) resins.

Exemplary polyethylene resins include copolymers of ethylene with an α-olefin having 3 to 20 carbon atoms (e.g., propylene, butene, hexene, or octene), or multicomponent copolymers containing ethylene and two or more of such α-olefins, where each of these copolymers contains ethylene in a content of 50 percent by mass or more.

Of polypropylene resins, preferred are random copolypropylene resins, homopolypropylene resins, and block copolypropylene resins. Each of different polypropylene resins may be used alone or in combination. As compared to other resins, such polypropylene resins more effectively help the metal sheet having poor elongation (particularly an aluminum alloy thin sheet) to have a uniform strain distribution. Specifically, the polypropylene resins significantly effectively help a laminated sheet including the polypropylene resin laminated with a metal sheet (particularly an aluminum alloy thin sheet) to have improved forming performance such as formability and form stability.

Exemplary random copolypropylene resins include known random copolymers of propylene with ethylene or an α-olefin having 4 to 20 carbon atoms. Exemplary block copolypropylene resins include known block copolymers of propylene with ethylene or an α-olefin having 4 to 20 carbon atoms.

Foaming Agent

The foaming agent can be any of organic foaming agents and inorganic foaming agents.

Examples of the organic foaming agents include azo compounds, nitroso compounds, and sulfonyl hydrazide compounds. Specific examples thereof include azodicarbonamide, barium azodicarbonate, azobisisobutyronitrile, N,N'-dinitrosopentamethylenetetramine, p-toluenesulfonyl hydrazide, p,p'-oxybis(benzenesulfonyl hydrazide), hydrazodicarbonamide, diphenylsulfone-3,3-disulfonylhydrazide, p-toluenesulfonylsemicarbazide, trihydrazinotriazine, and biurea. Among them, preferred are azo compounds such as azodicarbonamide, barium azodicarbonate, and azobisisobutyronitrile.

Exemplary inorganic foaming agents include sodium hydrogen carbonate and zinc carbonate.

As the foaming agent for use herein, preferred is a foaming agent that decomposes and evolves a gas upon heating at a temperature of 120° C. or higher (more preferably 150° C. or higher, furthermore preferably 180° C. or higher, and still more preferably 200° C. or higher). A foaming agent of this kind, when used, can be decomposed while the resin for the formation of the foamable resin sheet softens and thereby helps the foamable resin sheet to expand to a higher expansion ratio. Each of different foaming agents may be used alone or in combination.

The foaming agent(s) is contained in a content of preferably from 0.1 to 10 parts by mass, and more preferably from 0.5 to 5 parts by mass, per 100 parts by mass of the resin in the foamable resin sheet.

Foamable Resin Sheet

The foamable resin sheet containing the resin and the foaming agent may be obtained by kneading the resin and the foaming agent with each other, and forming the kneadate into a sheet. The kneading is preferably performed at a temperature lower than the thermal decomposition temperature of the foaming agent by 10° C. or more. This prevents expansion of the resin even when the kneading raises the temperature of the resin.

The foamable resin sheet for use herein may further contain any of other additives according to necessity. Exemplary additives include radical generators and crosslinking coagents.

The foamable resin sheet for use herein preferably has a thickness of from 0.5 to 1.4 mm. The foamable resin sheet, if having a thickness of less than 0.5 mm, may not effectively help the metal sheet to have a more uniform strain distribution upon cold forming of the laminated sheet, and this may cause rupture of the metal sheet during cold forming, thus resulting in significantly deteriorated forming performance. In contrast, the foamable resin sheet, if having a thickness of more than 1.4 mm, may relatively reduce the effect by the action of the metal sheet to such an extent as to be equal to that of the foamable resin sheet alone. In this case, the laminated sheet, even when formed into a predetermined shape by cold forming, may have poor form stability due to large spring back by which the laminated sheet tends to return to the original linear shape.

Adhesive

The adhesive for use herein has a melting point substantially equal to or higher than the melting point of the resin for the formation of the foamable resin sheet. Such a high-melting point adhesive, when used, allows the resin to soften and allows the foaming agent to decompose upon heating after cold forming, while the foamable resin sheet and the metal sheet each having residual stress are sufficiently bonded to each other, and this prevents delamination of the resulting foamed resin sheet after expansion from the metal sheet.

Specifically, the adhesive for use herein has a melting point of 145° C. or higher, and preferably 150° C. or higher.

Exemplary adhesive components usable herein include, but are not limited to, acrylic adhesives, polyolefinic adhesives, polyurethane adhesives, epoxy adhesives, phenolic adhesives, and ceramic adhesives. Of polyolefinic adhesives, preferred are modified polyolefinic adhesives copolymerized typically with ethylene or maleic acid, of which maleic-acid-modified polypropylene resin adhesives are more preferred.

When the resin is a polyolefinic resin, the adhesive for use herein is preferably a modified polyolefinic adhesive, for improved adhesion between the foamable resin sheet and metal sheet.

Metal Sheet

Examples of the metal sheet for use herein include aluminum sheets, aluminum alloy sheets, steel sheets, plated steel sheets, copper sheets, and titanium sheets. Among them, aluminum sheets, aluminum alloy sheets, steel sheets, and copper sheets are preferred.

Of aluminum alloy sheets, preferred are sheets made from refined materials selected from the group consisting of O materials, H22, H23, and H24 materials, H32, H33, and H34 materials, and T4 materials in terms of temper designation as specified in Japanese Industrial Standards (JIS) H0001, for better cold forming performance (forming workability and form stability after forming) of the laminated sheet.

While depending on the chemical composition of alloy, the aluminum alloy sheet for use herein preferably has such a strength as prescribed in JIS as 1000-series, 3000-series, 5000-series, and 6000-series aluminum alloys, because these aluminum alloys are significantly affected by refining. The aluminum alloy sheet, if composed of an aluminum alloy other than the 1000-series, 3000-series, 5000-series, and 6000-series aluminum alloys and undergone refining, may have a higher strength but an excessively low elongation and may not sufficiently help the laminated sheet to have satisfactory cold forming performance. Of 6000-series aluminum alloys, the material aluminum alloy is preferably selected from Omaterial and T4 material. Of 5000-series aluminum alloys, the material aluminum alloy is preferably selected from O material and H32, H33, and H34 materials.

The aluminum alloy sheet may be used as intact as having smooth surfaces without painting and surface treatment, but may undergo a generally used or known surface treatment such as plating and/or chemical conversion treatment, or processing for imparting asperities to the surface, such as embossing.

The metal sheets preferably each have a small thickness as small as possible for reduction in weight of the composite formed article. Specifically, the metal sheets each have a thickness of preferably from 0.05 to 1.0 mm, and more preferably from 0.05 to 0.5 mm. If at least one of the metal sheets has a thickness of less than 0.05 mm, the resulting composite formed article may have significantly poor flexural rigidity and flexural strength upon use. In contrast, if at least one of the metal sheets has a thickness of more than 1.0 mm, the resulting composite formed article may have an excessively large mass (weight).

Laminated Sheet

The laminated sheet according to the present invention preferably has a total thickness as small as possible and has a total thickness of preferably 3.4 mm or less, and more preferably 2.4 mm or less. The laminated sheet, when having a total thickness of 3.4 mm or less, not only has a reduced weight, but also forms a formed article by stamping under common conditions as in forming of a metal sheet alone.

The laminated sheet according to the present invention has a peel strength between the foamable resin sheet and the metal sheet of 1.0 N/mm or more in a T type peel test of the laminated sheet at a temperature of 150° C. and a peel rate of 100 mm/minute. This allows sufficient bonding between the foamable resin sheet and the metal sheet even when the laminated sheet is heated so as to soften the foamable resin sheet. The laminated sheet has a peel strength of preferably 2.0 N/mm or more, and more preferably 3.0 N/mm or more.

Manufacturing Method of Laminated Sheet

The laminated sheet according to the present invention may be manufactured by any method not limited, such as a method of applying the adhesive to one side of the metal sheet and then affixing the adhesive-applied surface of the metal sheet with the foamable resin sheet; or a method of laminating sheets of the adhesive, which have been prepared previously, onto both sides of the foamable resin sheet, and further laminating a pair of metal sheets onto the two adhesive sheets, respectively.

In a preferred embodiment of the present invention, an article prepared by laminating the metal sheets on both sides of the foamable resin sheet each through the medium of an adhesive layer is heated typically by being sandwiched between heated rolls. This allows the foamable resin sheet and the metal sheets to be monolithically bonded through the adhesive. The temperature of the heated rolls may be set to such a temperature as to be lower than the blowing (foaming) temperature of the foaming agent and in the vicinity of the melting point of the resin for the formation of the foamable resin sheet and that of the adhesive. This allows the foamable resin sheet including a resin inherently having no adhesiveness to be bonded with the metal sheets through the adhesive, and as a result, ensures an interfacial bonding strength between the foamable resin sheet and the metal sheet necessary for cold forming.

Composite Formed Article

A composite formed article according to an embodiment of the present invention may be manufactured from the laminated sheet according to any method, such as a method of subjecting the laminated sheet to hot forming (forming at a temperature higher than 120° C.) and heating the hot-formed article to allow the resin sheet to expand, but is preferably manufactured by subjecting the laminated sheet to cold forming, and heating the cold-formed article to allow the resin sheet to expand. Such cold forming facilitates the manufacture of a composite formed article having a complicated shape. In addition, cold forming more causes residual stress to remain in the resin for the formation of the foamable resin sheet than hot forming does, and in this case the effect of the use of an adhesive having a high melting point is more significantly exhibited.

Exemplary forming techniques for the laminated sheet include stamping (press forming) such as bulging, drawing, and bending forming. The formed laminated sheet may be heated to allow the resin sheet to expand, for example, by a process of heating the laminated sheet in a heating furnace of convective heat transfer type, such as a batch or continuous gas furnace or electric furnace.

The composite formed article according to the present invention includes a foamed resin sheet and, present on both sides thereof, a pair of metal sheets through the medium of the adhesive, which foamed resin sheet has been obtained through decomposition of the foaming agent in the foamable resin sheet.

The foamable resin sheet may be expanded into the foamed resin sheet at an expansion ratio of preferably from about 2 to about 20 (times). This ensures a composite formed article having a relatively large area to have both a light weight and satisfactory flexural rigidity and flexural strength. A composite formed article undergone expansion at an expansion ratio of less than 2 (times) may not have a lighter weight than a single metal sheet having the same flexural rigidity or flexural strength. A composite formed article undergone expansion at an expansion ratio of more than 20 (times) may remarkably deteriorate in flexural rigidity and flexural strength.

The foamed resin sheet has a thickness of preferably 0.2 mm or more, and more preferably 0.5 mm or more, with an upper limit in thickness of preferably 20 mm, and more preferably 10 mm.

It should be noted that various improvements, alternations, and modifications may be made based on knowledge of those skilled in the art, within the spirit and scope of the present invention.

EXAMPLES

The present invention will be illustrated in further detail with reference to several experimental examples below. It should be noted, however, that these examples are not intended to limit the scope of the present invention; various modifications may be made therein; and it is intended to cover in the appended claims all such modifications as fall within the true spirit and scope of the present invention. All parts and percentages are by mass, unless otherwise specified.

Initially evaluation methods used in the following experimental examples will be illustrated below.

Melting Point

Melting point was measured with a differential scanning calorimeter (DSC) by heating a specimen to 300° C. at a temperature rise rate of 10° C./minute.

T-Peel Strength

T-peel strength was measured by cutting out a specimen 210 mm long and 25 mm wide from a prepared laminated sheet, and subjecting the specimen to a T-peel test at a temperature of 150° C. and a peel rate of 100 mm/minute according to the method prescribed in JIS K 6854-3.

Experimental Example 1

Preparation of Laminated Sheet

An adhesive film 30 μm thick was prepared as an adhesive by using a maleic-acid-modified polyolefinic resin containing 10 percent by mass of maleic acid and having a melting point of 167° C.

A foamable polyolefinic resin sheet was prepared by kneading the following materials (A) to (F) at 155° C. using the LABO PLASTOMILL and extruding the kneadate into a sheet. The resulting sheet had an average thickness of 1.0 mm. The sheet after kneading had a melting point of 158° C.

(A) High-melting-point propylene based random copolymer (MFR: 7 g/10 minutes, melting point: 150° C.) in a content of 60%;

(B) Homopolypropylene (MFR: 3 g/10 minutes, melting point: 165° C.) in a content of 35%;

(C) Propylene-α-olefin random copolymer (TAFMER (registered trademark) XM-7080 supplied by Mitsui Chemicals Inc., MFR: 7 g/10 minutes, melting point: 83° C.) in a content of 5%;

(D) Azodicarbonamide (supplied by EIWA CHEMICAL IND. CO., LTD) in a content of 3 parts per 100 parts of the total of (A), (B), and (C);

(E) Radical generator "Perhexa 25B" (registered trademark, supplied by NOF CORPORATION) in a content of 0.05 part per 100 parts of the total of (A), (B), and (C); and (F) Crosslinking coagent triallyl isocyanurate in a content of 0.5 part per 100 parts of the total of (A), (B), and (C).

The adhesive film and an aluminum alloy sheet 0.3 mm thick (O material of JIS 3004 aluminum alloy single sheet) were stacked in this order on both sides of the above-prepared foamable polyolefinic resin sheet, the resulting article was heated at 180° C. for 90 seconds, and thereby yielded a laminated sheet. A specimen 210 mm long and 25 mm wide was cut out from the resulting laminated sheet and subjected to a T-peel test. The result is shown in Table 1.

Preparation of Composite Formed Article

A specimen 70 mm wide and 90 mm long was cut out from the above-prepared laminated sheet, subjected to stamping at room temperature (cold forming) into a semispherical shape of a formed height of 12.5 mm, heated at 210° C. for 600 seconds to decompose the foaming agent, and thereby yielded a composite formed article. The resulting composite formed article was cut, whose cross section was visually observed, and whether delamination between the aluminum alloy sheet and the foamed polyolefinic resin occurred or not was determined. The result is shown in Table 1.

Experimental Example 2

Preparation of Laminated Sheet

An adhesive layer having a dry thickness of 6 μm was formed on an aluminum alloy sheet by applying an adhesive to the surface of the aluminum alloy sheet, adjusting the thickness of the applied layer to 30 μm using a bar water, placing the aluminum alloy sheet with the applied layer in a drying furnace at a furnace temperature set at 200° C., and drying the same for 60 minutes. The adhesive contains a maleic-acid-modified polyolefinic resin (melting point: 166° C.) dispersed in toluene as a solvent. Thus, two plies of the aluminum alloy sheet having the adhesive layer with a dry thickness of 6 μm were prepared.

Next, the alloy sheets each having the adhesive layer were laminated on both sides of a foamable polyolefinic resin sheet the same as in Experimental Example 1 so that the adhesive layers served as adhesive faces, the resulting article was heated at 180° C. for 90 seconds, and thereby yielded a laminated sheet.

Preparation of Composite Formed Article

A composite formed article was prepared by the procedure of Experimental Example 1, except for using the above-prepared laminated sheet.

The laminated sheet and the composite formed article each prepared in Experimental Example 2 were subjected to a T-peel strength test (T-peel test) and detection of delamination by the procedures of Experimental Example 1. The results are indicated in Table 1.

Experimental Example 3

A laminated sheet and a composite formed article were prepared and subjected to a T-peel strength test and detection of delamination by the procedures of Experimental Example 1, except for using, as the adhesive, a maleic-acid-modified polyolefinic resin (melting point: 147° C.) film 30 μm thick.

TABLE 1

| | Adhesive | Melting point of adhesive (° C.) | Peel strength (N/mm) | Delamination after expansion |
|---|---|---|---|---|
| Experimental Example 1 | Maleic-acid-modified polyolefinic adhesive film | 167 | 1.73 | Absent |
| Experimental | Maleic-acid-modified | 166 | 5.50 | Absent |

TABLE 1-continued

| | Adhesive | Melting point of adhesive (° C.) | Peel strength (N/mm) | Delamination after expansion |
|---|---|---|---|---|
| Example 2 Experimental Example 3 | polyolefinic adhesive Maleic-acid-modified polyolefinic adhesive film | 147 | 0.15 | Present |

The results in Table 1 demonstrate that delamination between the foamed resin sheet and the metal sheet in the composite formed article can be suppressed by using an adhesive having a melting point substantially equal to or higher than the melding point of the resin for the formation of the foamable resin sheet.

The laminated sheet according to the present invention is useful as a material for providing a formed article (composite formed article) having a large area and having a complicated form, such as automotive panels and parts.

What is claimed is:

1. A laminated sheet comprising:
    a foamable resin sheet including a resin and a foaming agent; and
    a pair of aluminum alloy sheets present on both sides of the foamable resin sheet through the medium of an adhesive,
    the resin having a melting point of 145° C. or higher, and the adhesive having a melting point higher than the melting point of the resin;
    the resin is block copolypropylene resin of propylene with ethylene or an a-olefin having 4 to 20 carbon atoms,
    wherein the laminated sheet has a peel strength between the foamable resin sheet and the aluminum alloy sheet of 1.0 N/mm or more in a T-peel test at a temperature of 150° C. and a peel rate of 100 mm/min.

2. The laminated sheet according to claim 1, wherein the adhesive is a modified polyolefinic resin.

3. The laminated sheet according to claim 2, wherein the laminated sheet undergoes, before use, cold forming and subsequent heating to allow the foaming agent to expand.

4. A composite foamed article obtained by subjecting the laminated sheet of claim 2 to cold forming and subsequent heating so as to decompose the foaming agent.

5. The laminated sheet according to claim 1, wherein the laminated sheet undergoes, before use, cold forming and subsequent heating to allow the foaming agent to expand.

6. A composite foamed article obtained by subjecting the laminated sheet of claim 1 to cold forming and subsequent heating so as to decompose the foaming agent.

* * * * *